Oct. 25, 1966

A. S. FIALKOV ETAL 3,281,509

METHOD FOR HEAT TREATMENT OF GRAPHITE ARTICLES

Filed Jan. 7, 1963

United States Patent Office 3,281,509
Patented Oct. 25, 1966

3,281,509
METHOD FOR HEAT TREATMENT OF GRAPHITE ARTICLES
Abram Samuilovich Fialkov, Kootoozovsky prospekt 17, Apt. 95; Jakov Geljevich Davidovich, Detskaja 6/14, Apt. 1; and Leonid Gregorjevich Pakhomov, Novo-Gerejevo station, Tsentralnaja 30/3, all of Moscow, U.S.S.R.
Filed Jan. 7, 1963, Ser. No. 254,534
2 Claims. (Cl. 264—27)

This invention relates to the heat-treatment techniques of coal-graphite workpieces and providing them with certain desired physical properties.

Known techniques of this kind, which also require heating of the workpieces, provide for obtaining identical properties over the whole length of a workpiece. In a number of cases, however, it is required to obtain various physical properties, in different sections of a workpiece, with a sharp boundary between them.

To solve this problem, we propose to accomplish the heat-treatment by passing electric current of various magnitudes across different sections of a workpiece simultaneously subjecting these sections to cooling with different intensities. It is proposed to heat the two adjacent sections of a workpiece by applying three current-carrying clamps connected to two independent power sources; the middle clamp located on the boundary line between the two sections is to be connected in turn to both power sources.

To provide a boundary line between the adjacent sections of different configuration, it is proposed that the current-carrying clamp positioned between them should have edges of a shape corresponding to the configuration of the boundary line required.

To prevent oxidation of workpieces and additional changes of their porperties, the heating or workpieces should be performed in a neutral gas medium, e.g. in argon, or in a reducing medium, e.g. in hydrogen, or in a mixture of gases, which decompose on the surface of workpiece being heated, e.g. in the mixture of argon with carbonic acid gas $CO_2$ or with boron chloride $BCl_3$.

Figure 1:
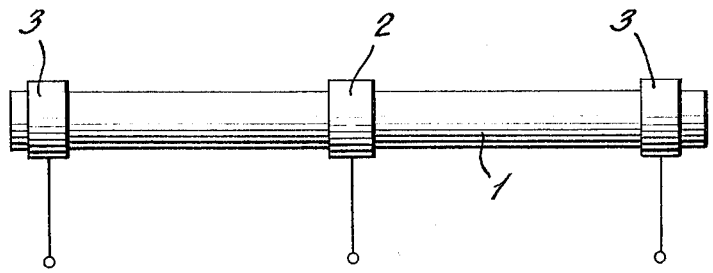
Figure 2:
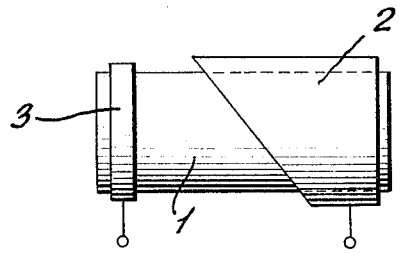
Figure 3:
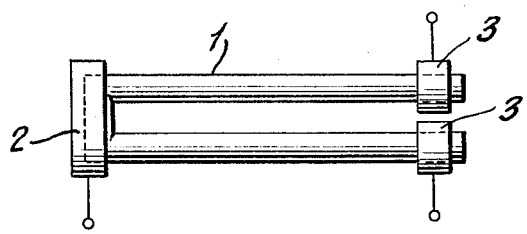

On the drawings herein appended FIG. 1 shows an arrangement of the current-carrying clamps for heat-treatment of a rectilinear-shaped workpiece; FIG. 2 represents an arrangement for the case when the boundary between the sections is set at an angle to the axis of the workpiece and FIG. 3 illustrates an arrangement for processing of loop-shaped workpieces.

The current-carrying clamp 2 is positioned on the boundary of the adjacent sections and the current-carrying clamps 3 are set on the outer ends of the piece. Each section is heated by means of an independent power source that is adjusted to its own predetermined operating duty.

Cooling of each section is performed by usual methods but with different intensities.

The initial materials used for the fabrication of coal-graphite, workpieces are: powders of natural graphite, coke, carbon black stock, oil coke, lamp black and commercial black.

As binders, pitch, resin and tar pitch, may be used. The workpieces of required shape are fabricated either by extrusion method in hydraulic presses or by press moulding.

After forming, the workpieces are subjected to baking at 1300° C.

The operations listed above are generally known and are preparatory to the technique presented herein. The heat-treating of coal-graphite workpieces according to the proposed technique is accomplished at a temperature of about 3000° C., whereas for obtaining a workpiece with different physical properties in its separate sections the above temperature should be correspondingly varied.

The proposed technique makes it possible to obtain:
  (a) highly effective thermocouples with operating temperatures up to 3000° C.;
  (b) semi-conductor units with one or more passages, which can be used as thermocouples, rectifiers, and the like;
  (c) collector brushes with physical properties varying over their cross-section.

The application of the proposed heat-treatment technique for coal-graphite workpieces provides a substantially economical effect.

What we claim is:
1. A method of forming a shaped article having non-uniform properties, which comprises forming a shaped article by molding a mixture of carbonaceous powder and a pitch-containing binder, baking the resulting molded article and subjecting the baked article to a heat treatment in which the amount of heat applied to one section of the article is different than the amount of heat applied to another section of the article so that the temperature of heat-treatment is not uniform throughout the article, said heat-treatment being applied by electrical sources and the non-uniformity in heat treatment temperature being created in part by subjecting local areas of the shaped article to different cooling effects.
2. The method as claimed in claim 1 wherein at least two independent electrical power sources are used to provide the heat-treatment for the article.

References Cited by the Examiner
UNITED STATES PATENTS

| | | | |
|---|---|---|---|
| 2,522,766 | 9/1950 | Swallen et al. | 264—105 XR |
| 2,607,809 | 8/1952 | Pitzer | 210—500 |
| 2,725,316 | 11/1955 | Fuller | 148—156 |
| 2,883,708 | 4/1959 | Sem | 264—29 |
| 2,960,419 | 11/1960 | Emeis. | |
| 3,001,237 | 9/1961 | Balaguer | 264—27 |
| 3,078,328 | 2/1963 | Jones | 148—186 |

ROBERT F. WHITE, *Primary Examiner.*

HYLAND BIZOT, *Examiner.*

J. A. FINLAYSON, *Assistant Examiner.*